United States Patent [19]

Pompei et al.

[11] Patent Number: 4,626,686
[45] Date of Patent: Dec. 2, 1986

[54] VARIABLE FIELD OF VIEW HEAT SCANNER

[75] Inventors: Francesco Pompei, Wayland; Shiraz Daya, Franklin; Domenico A. Pompei, Wayland, all of Mass.

[73] Assignee: Exergen Corporation, Natick, Mass.

[21] Appl. No.: 598,222

[22] Filed: Apr. 9, 1984

[51] Int. Cl.$^4$ ............................................. G01J 1/00
[52] U.S. Cl. ................................. 250/342; 374/124; 374/128
[58] Field of Search ............... 250/338 R, 342, 372; 374/112, 121, 124, 128

[56] References Cited

U.S. PATENT DOCUMENTS

| 4,315,150 | 2/1982 | Darringer et al. | 250/342 |
| 4,321,594 | 3/1983 | Galvin et al. | 250/342 |
| 4,420,265 | 12/1983 | Everest et al. | 374/124 |
| 4,456,390 | 6/1984 | Junkert et al. | 374/124 |
| 4,494,881 | 1/1985 | Everest | 374/124 |

*Primary Examiner*—Janice A. Howell
*Attorney, Agent, or Firm*—Hamilton, Brook, Smith & Reynolds

[57] ABSTRACT

A hand held radiation detector is adapted for scanning the subject while a bar graph at one end of the detector is observed. The field of view of the radiation detector is variable by means of removable lens assemblies which have Fresnel lenses positioned at the focal lengths of the lenses from the radiation sensor. The lens assemblies are matched to provide the same flux density to the radiation sensor independent of the field of view. Crosshairs provided on the rear of a lens support assist in aiming the radiation detector. The time constant of the display is varied with the sensitivity of the display.

14 Claims, 9 Drawing Figures

VARIABLE FIELD OF VIEW HEAT SCANNER

DESCRIPTION

Field of the Invention

This invention relates to radiation detectors and in particular to such detectors used for measuring heat loss from buildings, plumbing, machinery, electrical lines and the like and temperature differences.

BACKGROUND

A hand held radiation detector is disclosed in U.S. patent application Ser. No. 466,789, now U.S. Pat. No. 4,566,808, by Pompei and Daya. That radiation detector is a flat package having a radiation sensor at one end thereof and a bar graph display at the other end. The bar graph display has a quick response such that an area of interest can be scanned with the radiation sensor while the user of the instrument observes the bar graph. High and low levels of radiation within a scan are readily observed on the bar graph and differentials between the high and low regions are quickly obtained.

The detector has a field of view of about 12 degrees. The ratio of the viewing distance to the diameter of the viewed spot was approximately 5 to 1. Such a unit is particularly suited to scanning surfaces or devices at close to medium ranges of up to about 10 feet. For many applications, beyond about 10 feet the area viewed by the detector becomes large relative to the subject of interest. For example, when scanning an electrical line connection about 100 feet high on a pole, heat radiation from the connection is washed out by the background viewed by the detector because the connection is only a small portion of the overall field of view. Therefore, for such applications it would be desirable to have a unit having a smaller field of view such as about 1 or 2 degrees.

DISCLOSURE OF THE INVENTION

The present invention is primarily directed to a scanning radiation detector of the type disclosed in the above-mentioned patent application. A radiation sensor is positioned at one end of a hand held housing behind a main aperture. An electronically controlled display is positioned in the housing to provide an indication of sensed radiation. In accordance with one aspect of the present invention, a lens support is provided on the housing for retaining a removable lens assembly in front of the radiation sensor and aperture.

A plurality of removable lens assemblies can be provided for individual mounting in the lens support to provide a range of fields of view for the single radiation detector. The lens assemblies are matched such that each lens, each lens assembly aperture and the main aperture together pass an amount of radiation flux which is matched to the electronically controlled display. To provide lightweight, inexpensive lens assemblies, each lens assembly comprises a plastic barrel having a Fresnel lens therein. Each lens is positioned in its associated barrel such that when mounted to the lens support of the radiation detector it is positioned a distance from the radiation sensor about equal to its focal length.

The main aperture in the radiation detector is a limiting aperture for the lens assemblies which provide low to medium fields of view. Since the various lens assemblies use a common aperture, the radiation flux received from a given wide surface and sensed by the radiation sensor is independent of the field of view.

The limiting apertures for lens assemblies providing larger fields of view are carried in those lens assemblies. The amounts of flux passed to the sensor by those lens assemblies are a decimal factor less than the amount of flux passed by the small to medium field of view lens assemblies. That decimal factor can be accounted for by the electronically controlled display by means of a simple switch. That same switch can be used to vary the sensitivity of the display by a decimal factor when a given lens is being used.

In order to assist in locating the spot which is being viewed by the radiation sensor, the lens support is cylindrical and its diameter is greater than the width of the main housing of the radiation detector. The diameter of the lens support is selected so that, when the radiation detector is held at about arm's length, the lens support approximately matches a field of view of the detector. To assist in aligning the viewed lens support with the spot being viewed by the radiation sensor, sighting lines are provided on the rear surface of the lens support and on the far end of the main housing.

With the narrow field of view radiation detector, which has significant application to scanning of distant objects, a bar graph display is particularly useful. Rapid response of the bar graph is most important when scanning distant objects because a small angular movement of the detector results in a large distance of scan on the subject. On the other hand, when the unit is switched to a high sensitivity mode in which the incremental units of the bar graph are small, background noise can present a problem and additional filtering is required. That additional filtering can slow the response of the instrument. To maintain particularly fast response in the less sensitive modes of operation yet filter out noise in the more sensitive mode of operation, the switch which modifies the gain of the electronics to the display also modifies the time constant of the electronics. Specifically, to modify the gain, different resistors are switched into parallel connection with a primary feedback resistor across an operational amplifier. A filtering capacitor is connected across the primary resistor. As additional resistors are connected across the primary resistor to decrease gain, the RC time constant of the circuit is also reduced.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figures 1, 2:
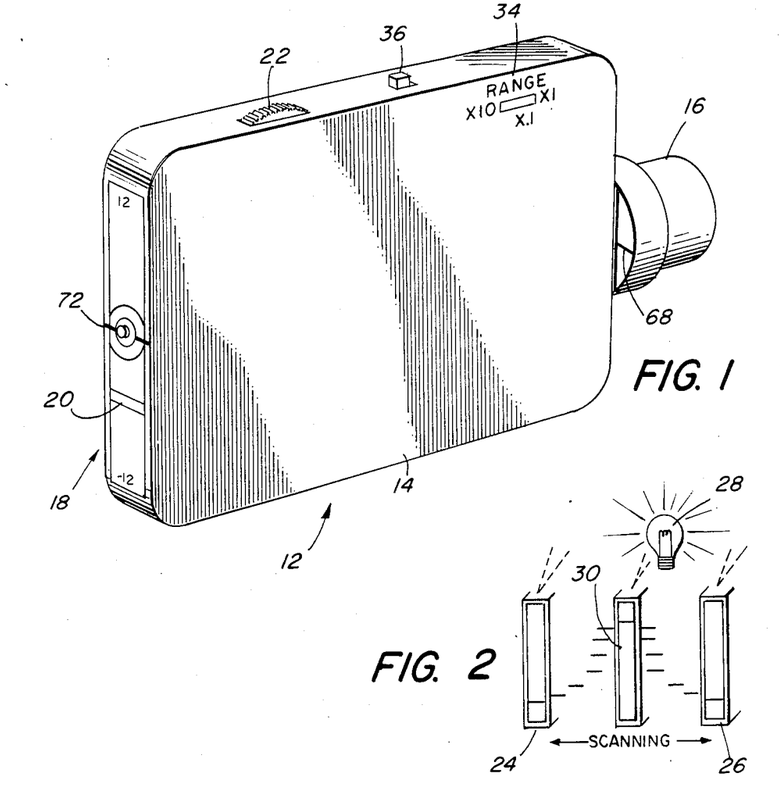
FIG. 1 is a perspective view of a heat detector embodying this invention and having a bar graph display at one end of the housing opposite to a radiation sensor and lens support.
FIG. 2 is a schematic illustration of use of the detector of FIG. 1 to scan a radiation source.

A radiation detector 12 comprises a box-like main housing 14. This housing has approximate dimensions of 3⅝ inches by 5 inches by ⅝ inch. The flat, hand held housing can be easily carried in a pocket. A lens mount 16 is positioned at one end of the housing 14 in front of a radiation sensor within the housing.

An LED bar graph display 18 is located at the end of the housing 14 opposite to the sensor assembly 16. This particular bar graph includes a scale centered at zero extending to plus and minus 12 BTU/hr-sq.ft. The same scale provides an approximation in degrees Fahrenheit within a temperature range of 40° F. to 120° F. The heat flux reading is accurate over a much larger range up to about 800 BTU/hr-sq.ft. with the unit shown in FIG. 1. The location of an illuminated region 20 on the scale provides an indication of radiation detected by the sensor assembly 16 relative to some reference established by a zeroing dial 22. For example, the radiation sensor 16 can be pointed toward a reference wall while the indication 20 is moved to the zero point or any other point on the scale by rotation of the dial 22. Any further readings on the scale are then referenced to that reference wall. Using this approach, a very simple bar graph of limited length can be used while the necessary information, that is differential information, is directly read from the bar graph. Specific uses of the differential readings will be discussed below.

The term "bar graph" is used loosely in that a full bar to the indication 20 is not displayed, although such a bar graph might also be used. In this case, only the uppermost portion of the "bar" is actually displayed. It is important, however, that the display be a linear display in which the position of a display element on a linear scale provides an analog indication of detected radiation. It is also important that the sensor and bar graph have a quick response in order that the user of the instrument can scan across an extended surface to provide a quick indication of maximum or minimum heat or temperature difference from a specific localized region of that surface.

FIG. 2 illustrates an example of the use of the device to scan a region to pinpoint a source of maximum radiation. While directed to a neutral surface as in the position 24, the indication 20 is set at a low region of the scale, as at about −6. The radiation sensor is then scanned across a wide field to a position 26. Within that field, the sensor senses radiation from a light source 28. As indicated by the scale positions shown schematically between the two end positions 24 and 26, the indication 20 rises to a maximum level at the position 30 at which the sensor is directed at the light source 28. The difference between the neutral reading and the peak reading is the difference measurement of interest. The maximum is much more readily picked up by an observer using a bar graph display than it would be with a digital numeric display.

In situations where the full 24 unit scale is not required, it is convenient to automatically zero the indication 20 when the device is pointed at a neutral surface. For that purpose, an electronic circuit may be provided to automatically zero the display. By pressing the power button 36 the indication 20 is automatically set at the zero position on the scale for the surface at which the sensor 16 is directed. Thereafter, a difference indication, which is often the indication of interest, can be read directly from the bar graph without further calculations. A switch may be provided in place of the dial 22, having three positions such that the user may select the display location for the automatic zero circuit. The user may then use the entire 24 position display range by selecting a zero location at the top or bottom as well as center.

To vary the sensitivity of the detector to allow for use of the full range of the scale where various levels of radiation are detected, a range switch 34 is provided. In this case, three range positions are provided; the units on the scale are to be multiplied by 0.1, 1, or 10.

To minimize drain on the battery which serves as the power supply for the unit, the unit is only operational when the button 36 is pressed.

Figure 3:
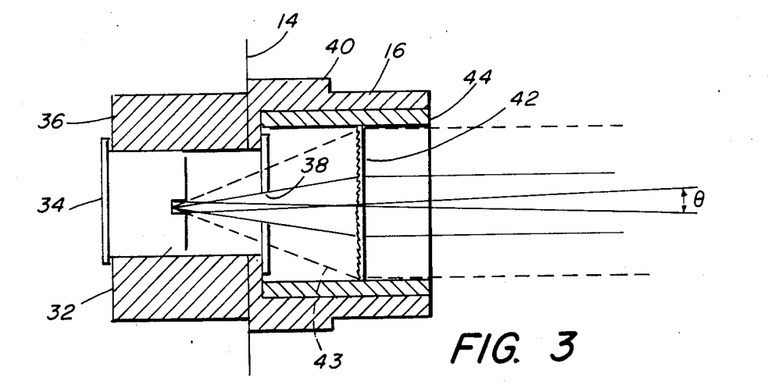
FIG. 3 is a cross sectional view of the lens support and radiation sensor of the unit of FIG. 1.

A cross sectional view of the sensor assembly and lens mount is shown in FIG. 3. A small thermopile radiation sensor 32 having an effective diameter of about 1 millimeter is mounted in a canister 34 which is in turn mounted in the bore of a plastic body 36. An aperture 38 is provided in a diaphragm 40 in front of the lens support 16. The aperture is 0.150 inch in diameter and is 0.39 inch from the sensor 32.

Any of a series of lens assemblies can be mounted to the lens support 16. FIG. 3 shows a lens assembly which provides for a field of view of about 2.5 degrees. The ratio of the distance of an object from the radiation detector to the diameter of the spot viewed by the sensor is approximately 25 to 1. The lens assembly comprises a Fresnel lens 42 mounted within a barrel 44. The barrel slides into the bore of the lens support 16 and is retained there by a light interference fit. Alternatively, the lens may be held by an external barrel sliding over the outer surface of the lens support. A Fresnel lens is particularly suited to this application because infrared radiation is absorbed by a lens to a much greater extent than visible radiation and the Fresnel lens can be made very thin to minimize that absorption. Being thin, it is also very light, an important characteristic of the hand held radiation detector which is held at arm's length.

The lens 42 is positioned at about its focal length from the radiation sensor 32 so that the near parallel rays are focused onto the radiation sensor. The sensor is therefore most sensitive to those rays. Parallel rays are received at the lens 42 and focused on the sensor 32 throughout the angle theta. That angle is determined by the effective diameter of the thermopile 32 and the focal length of the lens 42. From a few feet beyond the radiation detector, the field of view is approximately the angle theta shown in FIG. 3.

It can also be seen that the ratio of the distance of the viewed spot from the lens 42 to the diameter of the spot viewed across the angle theta is equal to the ratio of the focal length of the lens 42 to the diameter of the sensor 32. The lens 42 has a focal length of 25 millimeters which, with the 1 millimeter effective diameter of sensor 32, provides a field of view ratio of about 25:1.

Figure 4:
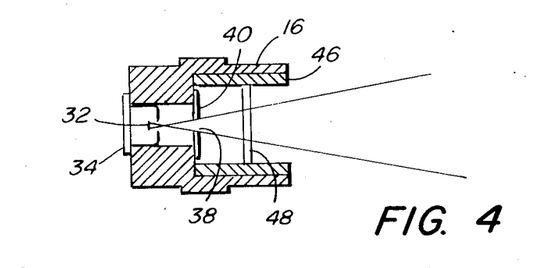
FIG. 4 is a cross sectional view similar to FIG. 3 but without a lens in the lens support.

A comparison of the field of view obtained with the lens 42 and the field of view obtained with no lens can be made by comparing FIG. 3 to FIG. 4. In FIG. 4, the lens assembly 42, 44 is replaced by another lens assembly including a barrel 46. The lens assembly of FIG. 4 has no lens. However, it does have a flat sheet of plastic of the same material as the lens of FIG. 3 in order to match the absorption characteristics of the lens for reasons to be discussed below. It can be seen from FIG. 4 that without a lens the field of view is established by the aperture 38. The ratio of the distance from the radiation detector to the spot diameter is approximately equal to the ratio of the distance of the aperture from the sensor 32 to the aperture diameter.

Thus, by making the sensor sensitive primarily only to collimated rays diffracted by the lens 42 to the sensor, the field of view of the unit of FIG. 3 is substantially reduced. The same reduction in field of view could be obtained with a smaller aperture and no lens but at a loss of radiation energy passed by the aperture. The light gathering power of the lens allows for a smaller field of view without loss of energy.

Figure 5:
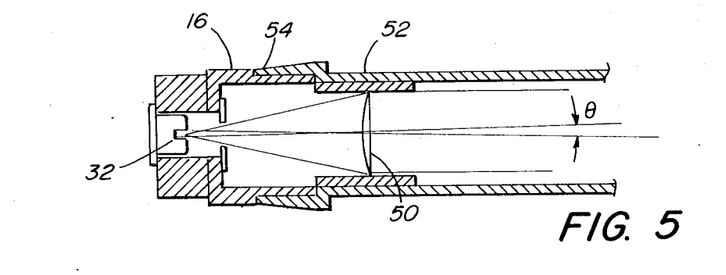
FIG. 5 is a cross sectional view similar to FIG. 3 but with a longer focal length lens which provides a narrower field of view.

The field of view can be increased even further by using a lens of a longer focal length and positioning that lens further from the sensor 32. Such a lens 50 is shown in FIG. 5. In this case, the lens assembly 42, 44 is removed from the bore of the lens support 16. Another lens assembly having an outer barrel 52 is fit over the lens support and abuts the step 54 in the support. The lens 50 is fixed within the barrel 52. The barrel 52 extends well beyond the lens 50 and thus serves to shade the lens, but that added length is not required. In the case of FIG. 5, the field of view theta is determined by the effective diameter of the sensor 32 and the longer focal length of 50 millimeters of the lens 50. Thus, the field of view ratio is 50:1 for an angle of about 1.25 degrees.

Figure 6:
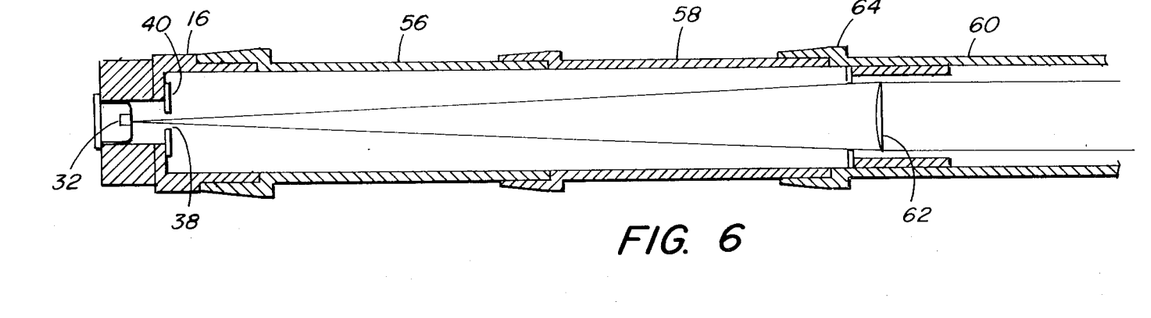
FIG. 6 is a cross sectional view similar to FIG. 3 but with a very long focal length lens mounted to the lens support with two extenders.

FIG. 6 illustrates yet a narrower field of view lens assembly. A first extension barrel 56 fits over the lens support 16 and a second extender 58 fits over the first. Finally, a barrel 60 which carries a lens 62 fits on the end of the extender 58. The lens 62 has a focal length of 200 millimeters for a field of view ratio of 200:1 and an angle of about 0.3 degrees.

Using a single extender 56 and a lens having a focal length of 100 millimeters, the field of view ratio of 100:1 can be obtained with an angle of about 1.25 degrees. Any other field of view can be obtained with the proper lens positioned at its focal length from the sensor.

Figure 7:
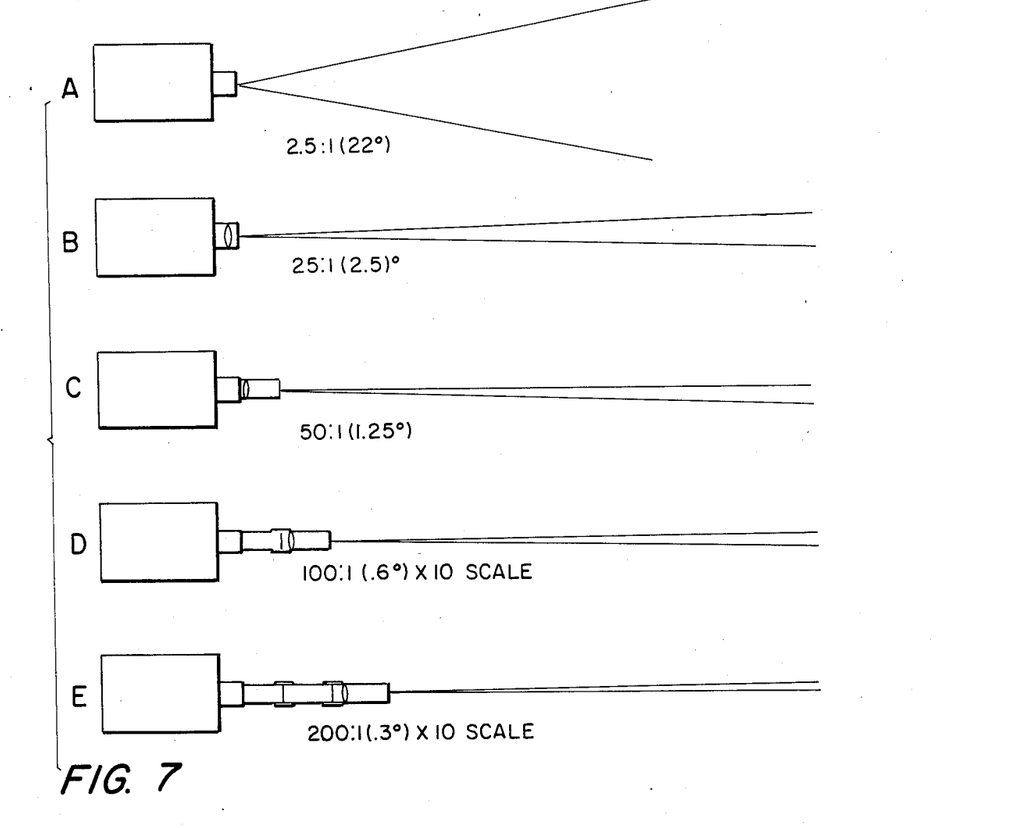
FIG. 7 illustrates a series of different field of view lens assemblies mounted to the radiation detector to illustrate the several fields of view.

A comparison of the various fields of view which are obtained by the various lens assemblies is illustrated in FIG. 7. The importance of light lens assemblies is particularly clear from FIG. 7E. The radiation detector is a small hand held unit which is intended to be held at arm's length. It is important that the extended lens assembly not provide such weight at the front end of the detector that it is difficult to hold the detector steady as the surface is scanned. Therefore, all parts of the lens assemblies are of light weight plastic.

It can be seen from FIG. 3 that the cone of light directed from the lens 42 toward the sensor 32, indicated by broken lines, is significantly larger than the cone of light 43 which is passed by the aperture 38. The aperture 38 is a limiting aperture in the optical system. Because a common aperture serves as the limiting aperture in each of the arrangements of FIGS. 3, 4 and 5, the radiation flux received at the sensor from a wide surface of uniform emission is the same in each arrangement. Thus, a uniform surface can be viewed by the large field of view assembly of FIG. 4 or through each of the lens assemblies of FIGS. 3 and 5, and the flux density received at the sensor, that is the BTU/hr-sq.ft., is the same for each. Therefore, the electronically controlled display of the radiation detector provides the very same output without regard to the lens assembly position on the lens mount 16. This effect is demonstrated by the following analysis.

Where the distance D from the lens to the viewed surface is much greater than the lens diameter:

$$\frac{D}{s} = \frac{F}{d} \quad (1)$$

where s is the diameter of the viewed spot, F is the focal length of the lens and d is the detector diameter. The energy at the lens (BTU/hr-sq.ft.) is proportional to $s^2$. The energy E at the aperture is proportional to the product of the lens energy and the square of the ratio of the aperture diameter to the diameter c of the cone 43 at the aperture. Thus:

$$E \alpha \, s^2 \times \frac{a^2}{c^2} \quad (2)$$

Substituting from equation 1:

$$E \alpha \, \frac{D \times d^2}{F} \times \frac{a^2}{c^2} \quad (3)$$

From trigonometry, C α 1/F. Thus:

$$E \alpha \, \frac{D^2 \times d^2}{F^2} \times a^2 \times F^2 \quad (4)$$

$$\alpha \, D^2 \, d^2 \, a^2 \quad (5)$$

Therefore, the energy at the aperture sensed by the sensor 32 is independent of the lens power as long as the cone fills the aperture 38.

The amount of flux sensed by the sensor 32 is dependent on absorption and scattering at the lens as well as on the size of the limiting aperture. Therefore, it is important that those two features of each lens assembly, in association with the main aperture 38, be matched. To that end, the flat plastic sheet 48 is provided in the lens assembly 46 even though the field of view is determined entirely by the aperture. Absorption in sheet 48 matches that in lenses 42 and 50.

The concept of the same flux passing to the sensor with the different field of view lens assemblies can be considered intuitively. As the field of view increases, the flux entering the lens comes from an increasingly larger area. However, the percentage of the light from the lens which is allowed to pass through the aperture decreases.

It can be seen in FIG. 6 that the narrow field of view lens assembly carries its own aperture 64 which establishes a cone of rays directed to the sensor 32. At the diaphragm 40, that cone of rays is smaller in diameter than the aperture 38. Therefore, when that lens assembly is positioned on the radiation detector the flux which is sensed by the sensor 32 is substantially reduced and, if no compensation were provided, would provide an error in the bar graph display. To avoid that error, the aperture 64 is sized and positioned to reduce the flux which passes through the aperture 38 by a factor of 10. To compensate for that factor of 10 reduction in radiation flux, the switch 34 can be switched to the ×0.1 position to increase the sensitivity of the electronically controlled display by a factor of 10. The user need only recognize that in using the very narrow field of view lens assembly, the flux readout on the display must be multiplied by a factor of 10.

Figure 8:
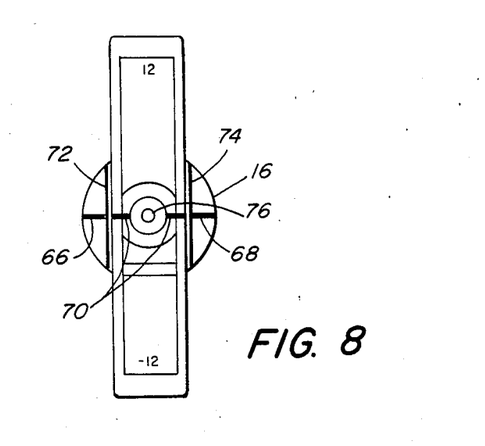
FIG. 8 is an end view of the radiation detector of FIG. 1 illustrating the means for sighting the subject being scanned by the radiation detector.

The radiation detector described in the above-mentioned Pompei et al. patent application matches the width of the housing 14 to the field of view of that detector in order that the unit can be held at arm's length and provide an indication of the size of the spot being viewed by the radiation detector. With the present radiation detector, the 25:1 field of view is intended to be the standard unit. The lens mount 16 is of a diameter which, when held away at about arm's length of about 25 inches, defines the spot being viewed. In order to locate that spot, crosshairs are painted on the rear surface of the lens mount. Specifically, crosshairs 66 and 68 extend perpendicular to the major faces of the housing 14. When the radiation detector is properly oriented in a vertical plane those crosshairs are in line with crosshairs 70 formed at the opposite end of the housing across the bar graph.

To establish the position of the radiation detector in a horizontal plane, sighting lines 72 and 74 are provided on either side of the housing 14 on the back surface of the lens mount 16. When the radiation detector is properly in line, those lines 72 and 74 are viewed just to either side of the housing. With the sighting lines properly positioned when viewing the back surface of the radiation detector as shown in FIG. 8, the spot which is being viewed by the radiation sensor, when the 25:1 lens assembly is positioned in the lens support, is just covered by the lens support.

To give an indication of the size of the spot being viewed when the 200:1 lens assembly is used, the zero indication 76 on the bar graph can be sized to match the field of view. Larger circles concentric with the zero circle provide spot sizes for different fields of view.

Figure 9:
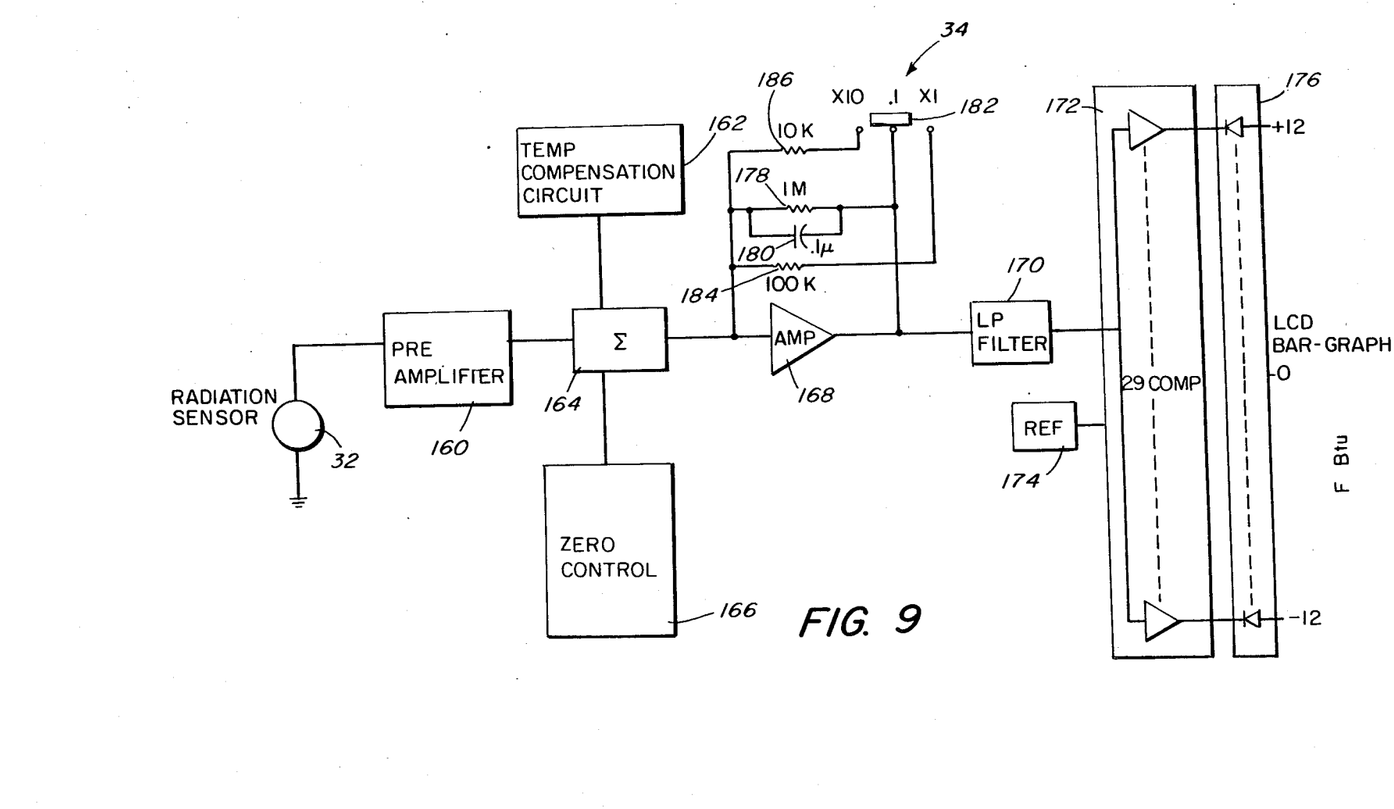
FIG. 9 is an electrical schematic diagram of the radiation sensor and electronically controlled display.

A block diagram of the electrical circuit used in the detector is provided in FIG. 9. The signal from the thermopile sensor element 32 is amplified in a preamplifier 160. The thermopile signal is a function of both the temperature of the subject and the temperature of the thermopile. To compensate for the latter temperature, the temperature of the thermopile may be sensed and processed in a temperature compensation circuit 162. When added to the thermopile signal in the summing circuit 164, a signal which is dependent only on the subject is obtained. The thermopile signal is also summed with a zero control signal from the zero control circuit 166. That circuit may respond to the manual zero control, or it may be an auto zero circuit.

The compensated and zeroed signal is amplified in an amplifier 168. The gain of that amplifier is determined by the range switch 34. The amplified signal is applied through a low pass filter 170 to a bank of comparator circuits 172. Depending on the level of the signal from the filter 170 relative to a reference 174, one of the comparators in the bank 172 draws current through a light emitting diode in the array 176. The diodes in the array 176 are arranged to form the bar graph display 18.

When viewing distant objects with more limited fields of view, it is particularly important that the bar graph display have a quick response. The further the object is from the detector the greater is the transverse distance of scan with a given angular displacement of the detector. The display must repond to variations in radiatior flux as that larger distance is scanned. On the other hand, when the unit is switched to the high sensitivity positioned of the ×0.1 position of switch 34, background noise can be extreme and greater filtering, which leads to slower response, is required. To overcome those problems, the feedback circuitry to amplifier 168 changes the filtering characteristics of the amplifier as the gain is changed by the switch 34. The low pass filter 170 is a very small filter. The main filtering is accomplished by the operational amplifier 168.

When the three position switch 34 is in the position shown in FIG. 9, only the 1 megaohm resistor 178 and the 0.1 microfarad capacitor 180 are connected in the amplifier feedback circuit. Those circuit elements provide a large time constant of about 600 milliseconds. When the switch 34 is moved to the x1 position, the switch contact 182 bridges two leads to connect a 100K resistor 184 in parallel with the RC network 178, 180. This parallel resistor decreases the gain of the amplifier 168 and also decreases the time constant of the circuit to about 60 milliseconds. Finally, when the switch 34 is moved to the ×10 position, the contact 182 connects the 10K resistor 186 in parallel with the RC circuit 178, 180 to further decrease the gain and to decrease the time constant to 6 milliseconds.

A disadvantage of using the smaller apertures in the 100:1 and 200:1 lens assemblies is that they require the switch 34 to be set at the ×0.1 position if the unit would have otherwise been set at the ×1 position. For that reason, distant objects viewed by the very narrow field of view lens assembly are more likely to fall in the slower response mode. However, as a practical matter, distant objects are often high temperature subjects and the unit would be switched to the ×1 or ×10 mode so that faster response would be obtained.

It can also be noted that the small aperture lens assemblies offer the further advantage of allowing the system to view substantially greater radiation flux. The maximum flux which can be sensed by the particular unit disclosed can be increased from 800 BTU/hr-sq.ft. to 8000 BTU/hr-sq.ft.

The above-described radiation detector offers much greater flexibility than that presented in the above-mentioned Pompei et al. application. The present unit allows for a selection of field of view from very wide for use in scanning large close-up surfaces to much smaller for scanning distant pipes, electrical connectors and the like.

The usefulness of the radiation detector described above can best be recognized through a few examples of use of the device. As one example, one may check a steam trap between two lengths of pipe by scanning along the pipe past the trap. Properly functioning traps show a significant temperature difference of 10 degrees or more between the steam side piping and condensate side piping. This temperature difference should be seen when one scans across trap from the upstream pipe to the downstream pipe. If there is no difference in temperature, the the trap is almost certainly leaking. If the steam to the device served by the trap is off, then the downstream temperature may be higher than the upstream temperature.

For traps which are at a distance, for example 10 feet high along a ceiling, the best method for testing is to scan across the piping, both upstream and downstream of the trap. If necessary, the times 0.1 scale may be used to improve sensitivity. A leaky trap shows the same reading upstream and downstream. In such an application a narrow field of view of 50:1 is best.

Voids, wet spots and air leaks in insulation can be located by scanning building walls, furnace walls, piping, vessels and so on. One need only scan the surface of interest with the radiation detector and watch the bar graph display. Hot and cold spots are identified by the ups and downs of the display. With such applications, a wider field of view of 2.5:1 or 25:1 is best.

Out of reach air supply registers can be quickly checked by scanning the registers with the radiation detector. For cooling sources, the air supply should be 10° F. below room temperature, then the scan should show the dot drop about 10° F. as the register is scanned. The same holds for warm air sources. The warm or cold air heats or cools the register and this is detected by the radiation detector. A 25:1 field of view is generally suitable.

Operating in the ×0.1 range, the radiation detector can detect even very small amounts of heat generated by electric power flowing through a good junction such as a fuse, circuit breaker or the like. It can be determined whether a circuit is carrying power even without an ammeter. A good electrical junction should be no more than a few degrees above ambient. A poor junction is considerably hotter and may be detected even with the junction box cover closed. A 25:1 field of view is generally a good choice.

Similarly, the friction heat generated by bad bearings in motors and other equipment can be quickly checked by scanning with the radiation detector. If the bearing scans at more than 40° or 50° F. above ambient, it should be investigated. A field of view of 2.5:1 or 25:1 is generally best.

Steam lines under floors and in walls and ceilings generate considerable heat and can easily be found by scanning a surface and looking for the telltale movement of the bar graph display. The piping can be traced by following the heat as indicated by the display. Leaks in the piping show up as hot spots. A 25:1 or 50:1 field of view is best.

For detecting the presence or absence of a gas flame in an oil field flare in daylight, the 200:1 would be most appropriate. The flare can be several hundred feet away, and of small dimensions, but be very hot. The high resolution and high speed of the 200:1 in the lower gain settings would be most appropriate.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A radiation detector for providing an indication of the radiation from a surface area, the detector comprising:
   a housing adapted to be hand held;
   a radiation sensor positioned in the housing behind a main aperture for sensing radiation from the surface area;
   an electronically controlled display in the housing to provide an indication of sensed radiation flux;
   a lens support for retaining a removable lens assembly in front of the radiation sensor and aperture; and
   a plurality of removable and interchangeable lens assemblies of different focal lengths to be retained by the lens support and to provide different fields of view for the detector, each lens assembly comprising a Fresnel lens positioned in the barrel with the lens positioned at about its focal length from the radiation sensor, the main aperture being the limiting aperture of the detector such that the density of radiation from a given uniform surface area sensed by the radiation sensor is independent of which of said plurality of lens assemblies is retained by the lens support.

2. A radiation detector for providing an indication of the radiation from a surface area, the detector comprising:
   a housing adapted to be hand held;
   a radiation sensor positioned in the housing behind a main aperture for sensing radiation from the surface area;
   a fixed calibration electronically controlled display in the housing to provide an indication of sensed radiation flux;
   a lens support for retaining a removable lens assembly in front of the radiation sensor and aperture; and
   a plurality of removable lens assemblies for individual mounting in the lens support, each lens assembly comprising a lens positioned in a barrel, the lens assemblies providing different fields of view for the detector and being matched such that each lens, each lens assembly aperture and the main aperture together pass an amount of radiation flux from the surface area to the radiation sensor which is matched to the precalibrated electronically controlled display in that the flux density of radiation from a given uniform surface area sensed by the radiation sensor is the same or different by a decimal factor for each lens assembly.

3. A radiation detector as claimed in claim 2 wherein the lens in each lens assembly is a Fresnel lens mounted for positioning at a distance from the radiation sensor about equal to the focal length of the lens.

4. A radiation detector as claimed in claim 2 further comprising a switch for varying the sensitivity of the electronically controlled display by a decimal factor and further comprising lens assemblies which pass matched amounts of radiation flux which are different by a decimal factor corresponding to the decimal factor of the change in sensitivity of the electronically controlled display.

5. A radiation detector as claimed in claim 2 wherein the main aperture is a limiting aperture for a plurality of lens assemblies.

6. A radiation detector as claimed in claim 2 wherein the lens support extends beyond the sides of the housing and a crosshair is provided on the back of the lens support.

7. A radiation detector as claimed in claim 6 wherein the lens support is cylindrical and the diameter of the lens support across a line of sight, with the housing held a predetermined distance within arm's length from the user's eye in the field of sight, defines an approximate field of view of the radiation detector with a particular lens assembly.

8. A radiation detector as claimed in claim 2 wherein the lens support is cylindrical and the diameter of the lens support across a line of sight, with the housing held a predetermined distance within arm's length from the user's eye in the field of sight, defines an approximate field of view of the radiation detector with a particular lens assembly.

9. A radiation detector as claimed in claim 2 wherein the electronically controlled display includes an amplifier having an RC feedback circuit to establish the gain of the electronically controlled display and the filtering characteristics of the electronically controlled display, the radiation detector further comprising a switch for adjusting the gain of the amplifier while simultaneously adjusting the filtering characteristics of the amplifier such that a higher RC time constant is provided with a higher gain.

10. A radiation detector as claimed in claim 2 wherein the electronically controlled display includes a bar graph display.

11. A radiation detector for providing an indication of the radiation from a surface area, the detector comprising:
   a flat housing adapted to be held by hand in a line of sight between a user and the surface area, the housing having a cylindrical element which extends beyond the main body of the housing in a transverse direction, forward of the rear surface of the housing, and which approximates the field of view of the radiation detector, there being a crosshair on the rear surface of the transverse extension and another crosshair on the rear surface of the main body of the housing to be matched to the first crosshair.

12. A radiation detector for providing an indication of the radiation from a surface area, the detector comprising:
   a flat housing adapted to be hand held;
   a radiation sensor positioned in the housing behind a main aperture for sensing radiation from the surface area;
   a precalibrated electronically controlled bar graph display in the housing to provide an indication of sensed radiation flux with a display on the end of the housing opposite to the radiation sensor and main aperture;
   a cylindrical lens support for retaining a removable lens assembly in front of the radiation sensor and aperture, the lens support having a diameter greater than the width of the main body of the housing, the lens support having a crosshair formed on the back surface thereof; and
   a plurality of removable lens assemblies for individual mounting on the lens support, each lens assembly comprising a Fresnel lens positioned in a barrel for positioning at a distance from the radiation sensor about equal to the focal length of the lens, the lens assemblies providing different fields of view for the detector and being matched such that each lens, each lens assembly aperture and the main aperture together pass an amount of radiation flux from the surface area to the radiation sensor which is matched to the precalibrated electronically controlled display in that the flux density of radiation from a given uniform surface area sensed by the radiation sensor is the same or different by a decimal factor for each lens assembly, the main aperture being a limiting aperture for a plurality of lens assemblies.

13. A radiation detector as claimed in claim 12 wherein the electronically controlled display includes an amplifier having an RC feedback circuit to establish the gain of the electronically controlled display and the filtering characteristics of the electronically controlled display, the radiation detector further having a switch for adjusting the gain of the amplifier while simultaneously adjusting the filtering characteristics of the amplifier such that a higher RC time constant is provided with a higher gain.

14. A radiation detector for providing an indication of the radiation from a surface area, the detector comprising:
   a housing adapted to be handheld;
   a radiation sensor positioned in the housing beyond a main aperture for sensing radiation from the surface area;
   a fixed calibration electronically controlled display in the housing to provide an indication of sensed radiation;
   a removable aperture support for mounting in the field of view of the radiation sensor for limiting the flux density of radiation received by the radiation sensor, the removable aperture being sized relative to the main aperture such that the flux density of radiation from a given uniform surface area sensed by the radiation sensor is different by a decimal factor when the removable aperture is in place; and
   means for changing the sensitivity of the electronically controlled display by a factor of 10.

* * * * *